United States Patent
Kang et al.

(10) Patent No.: US 12,002,962 B2
(45) Date of Patent: Jun. 4, 2024

(54) ELECTRODE FOR ELECTROCHEMICAL DEVICE COMPRISING DRY ELECTRODE FILM AND METHOD FOR MANUFACTURING THE SAME

(71) Applicant: LG Energy Solution, Ltd., Seoul (KR)

(72) Inventors: Seong-Wook Kang, Daejeon (KR); Jae-Sung Han, Daejeon (KR); Dong-Mok Shin, Daejeon (KR); Dong-Oh Shin, Daejeon (KR); Kyung-Hwan Yoon, Daejeon (KR); Kwang-Ho Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/881,879

(22) Filed: Aug. 5, 2022

(65) Prior Publication Data
US 2023/0042207 A1   Feb. 9, 2023

(30) Foreign Application Priority Data

Aug. 6, 2021  (KR) .................. 10-2021-0104169
Aug. 4, 2022  (KR) .................. 10-2022-0097481

(51) Int. Cl.
*H01M 4/62*     (2006.01)
*H01M 4/04*     (2006.01)
*H01M 10/0525*  (2010.01)

(52) U.S. Cl.
CPC ......... *H01M 4/623* (2013.01); *H01M 4/0404* (2013.01); *H01M 4/0416* (2013.01); *H01M 4/0435* (2013.01); *H01M 10/0525* (2013.01)

(58) Field of Classification Search
CPC .. H01M 4/623; H01M 4/0404; H01M 4/0416; H01M 4/0435; H01M 10/0525;
(Continued)

(56) References Cited

U.S. PATENT DOCUMENTS

2006/0257741 A1* 11/2006 Mansuetto ............... C01G 3/02
                                                               429/220
2015/0061176 A1   3/2015 Bruckner et al.
(Continued)

FOREIGN PATENT DOCUMENTS

JP         5209874 B2   6/2013
JP      2016186921 A   10/2016
(Continued)

OTHER PUBLICATIONS

International Search Report for Application No. PCT/KR2022/011591 dated Nov. 18, 2022, pp. 1-3.
(Continued)

*Primary Examiner* — Gary D Harris
(74) *Attorney, Agent, or Firm* — Lerner David LLP

(57) ABSTRACT

Disclosed is a method for manufacturing a dry electrode. The method allows determination of the micro-fibrilization degree of a binder resin from the crystallinity of the binder resin. Based on this, the processing conditions of mixed powder for electrode or an electrode film may be controlled. In this manner, it is possible to check and control the processing conditions easily and efficiently. In addition, the method for manufacturing a dry electrode includes a kneading step using a kneader under a low speed and high temperature and pulverization step. Therefore, there is no problem of blocking of a flow path caused by aggregation of the ingredients, which is favorable to mass production.

14 Claims, 2 Drawing Sheets

(58) Field of Classification Search
CPC .... H01M 4/0471; H01M 4/622; H01M 10/05; H01M 10/058; Y02E 60/10
USPC .......................................................... 429/209
See application file for complete search history.

(56) References Cited

U.S. PATENT DOCUMENTS

| | | |
|---|---|---|
| 2015/0072234 A1 | 3/2015 | Mitchell et al. |
| 2015/0255779 A1 | 9/2015 | Hong et al. |
| 2015/0303481 A1 | 10/2015 | Duong et al. |
| 2016/0329566 A1 | 11/2016 | Jung et al. |
| 2016/0340476 A1 | 11/2016 | Sonntag et al. |
| 2017/0256367 A1 | 9/2017 | Raman et al. |
| 2018/0159131 A1 | 6/2018 | Seol et al. |
| 2019/0305316 A1 | 10/2019 | Wang et al. |
| 2020/0168895 A1 | 5/2020 | Kim et al. |
| 2020/0212428 A1 | 7/2020 | Han et al. |
| 2020/0274164 A1* | 8/2020 | Nakano ............... H01M 10/054 |
| 2022/0006071 A1 | 1/2022 | Petrowsky et al. |

FOREIGN PATENT DOCUMENTS

| | | | |
|---|---|---|---|
| JP | 2018195587 A | 12/2018 | |
| KR | 101211968 B1 | 12/2012 | |
| KR | 20140136952 A | 12/2014 | |
| KR | 20160040125 A | 4/2016 | |
| KR | 20160138959 A | 12/2016 | |
| KR | 20180119158 A | 11/2018 | |
| KR | 101937897 B1 | 1/2019 | |
| KR | 20190038163 A | 4/2019 | |
| KR | 102069655 B1 | 1/2020 | |
| KR | 20200138263 A * | 12/2020 | ........ H01M 10/0525 |
| KR | 20200138263 A | 12/2020 | |
| KR | 102202013 B1 | 1/2021 | |
| KR | 20210087995 A | 7/2021 | |
| WO | 2005008807 A2 | 1/2005 | |
| WO | 2019222110 A1 | 11/2019 | |

OTHER PUBLICATIONS

Extended European Search Report including Written Opinion for Application No. 22189055.1 dated Feb. 17, 2023, pp. 1-9.

* cited by examiner

ELECTRODE FOR ELECTROCHEMICAL DEVICE COMPRISING DRY ELECTRODE FILM AND METHOD FOR MANUFACTURING THE SAME

CROSS-REFERENCE TO RELATED APPLICATION

This application claims priority from Korean Patent Application No. 10-2021-0104169, filed on Aug. 6, 2021, and Korean Patent Application No. 10-2022-0097481, filed Aug. 4, 2022, the disclosures of which are incorporated herein by reference.

TECHNICAL FIELD

The present disclosure relates to an electrode for an electrochemical device including a dry electrode film and a method for manufacturing the same. The present disclosure also relates to the dry electrode film and a method for manufacturing the same. In addition, the present disclosure relates to mixed powder for an electrode used for manufacturing the dry electrode film and a method for preparing the same.

BACKGROUND ART

Due to a rapid increase in use of fossil fuel, there has been an increasing need for use of substitute energy and clean energy. The most actively studied field as a part of attempts to meet such a need is the field of power generation and power storage using electrochemistry. Currently, typical examples of electrochemical devices using electrochemical energy include secondary batteries, and application thereof has been extended gradually. A lithium secondary battery as a representative of such secondary batteries has been used not only as an energy source of mobile instruments but also as a power source of electric vehicles and hybrid electric vehicles capable of substituting for vehicles, such as gasoline vehicles and diesel vehicles, using fossil fuel and regarded as one of the main causes of air pollution, recently. In addition, application of such a lithium secondary battery has been extended even to a supplementary power source of electric power through the formation into a grid. A process of manufacturing such a lithium secondary battery is broadly divided into an electrode-forming step, an electrode assembly-forming step and an aging step. The electrode-forming step is further divided into an electrode mixture-mixing step, electrode coating step, drying step, pressing step, slitting step, winding step, or the like. Among the steps, the electrode mixture-mixing step is a step of mixing the ingredients for forming an electrode active layer configured to carry out electrochemical reactions actually in the electrode. Particularly, an electrode active material as an essential element of the electrode is mixed with a binder used for the binding of powder particles among themselves and for adhesion to a current collector, a solvent for imparting viscosity and dispersing powder, or the like, to prepare slurry having flowability.

Such a composition mixed for forming an electrode active layer is also called an electrode mixture in a broad sense. After carrying out the above-mentioned steps, an electrode coating step of applying the electrode mixture onto a current collector having electrical conductivity and a drying step of removing the solvent contained in the electrode mixture are carried out, and then the resultant electrode is pressed to a predetermined thickness.

Meanwhile, as the solvent contained in the electrode mixture evaporates during the drying step, defects, such as pinholes or cracks, may be generated in the preliminarily formed electrode active layer. In addition, the electrode active layer is not dried uniformly at the internal part and external part thereof, and thus a powder floating phenomenon may occur due to a difference in solvent evaporation rate. In other words, powder present in a portion dried earlier may float, while forming a gap from a portion dried relatively later, resulting in degradation of electrode quality.

Therefore, to solve the above-mentioned problems, there has been considered a drying apparatus which allows uniform drying of the internal and external parts of an electrode active layer and can control the evaporation rate of a solvent. However, such drying apparatuses are expensive and require a lot of costs and times for their operation, and thus are disadvantageous in terms of manufacture processability. Therefore, recently, active studies have been conducted to manufacture a dry electrode without using any solvent.

In general, the dry electrode is obtained by laminating a free-standing film, including an active material, a binder and a conductive material and prepared in the form of a film, onto a current collector. First, an active material, a carbonaceous material as a conductive material and a binder capable of fibrilization are mixed by using a blender, the binder is fibrilized through a high-shear mixing process, such as jet milling, and then the resultant mixture is subjected to calendering to form a film shape, thereby providing a free-standing film. Then, the free-standing film obtained after the calendering is laminated onto a current collector to obtain a dry electrode.

However, when the active material having brittleness is subjected to such a high-shear mixing process, a large amount of fine powder having a small powder size is formed to cause degradation of mechanical or electrochemical performance. In addition, when such a high-shear mixing is carried out excessively, the resultant binder fibers may be cut to cause degradation of the flexibility of the free-standing film.

Therefore, there is an imminent need for developing techniques for manufacturing a dry electrode which can solve the above-mentioned problems. Particularly, it is required to provide a method which can quantitively analyze the mixing uniformity of the mixture containing the ingredients for manufacturing the dry electrode film or the state (fibrilization degree, etc.) of the binder, and to establish the processing conditions.

DISCLOSURE

Technical Problem

The present disclosure is designed to solve the problems of the related art, and therefore the present disclosure is directed to providing a dry electrode which shows minimized micronization of an active material and maximized binder fibrilization, and a method for manufacturing the same.

The present disclosure is also directed to providing a dry electrode having improved mechanical properties, such as flexibility and strength, and a method for manufacturing the same.

In addition, the present disclosure is directed to providing a method for manufacturing a dry electrode which uses processing conditions based on the crystallinity of a binder resin.

Technical Solution

According to the first embodiment of the present disclosure, there is provided an electrode for an electrochemical device, including a dry electrode film obtained by a dry manufacturing process using no solvent, wherein the dry electrode film includes an electrode active material, a conductive material and a binder resin, and the binder resin contained in the dry electrode film has a crystallinity of 10% or less.

According to the second embodiment of the present disclosure, there is provided the electrode for an electrochemical device as defined in the first embodiment, wherein the dry electrode film has a tensile strength of 0.5 MPa or more in the machine direction (MD).

According to the third embodiment of the present disclosure, there is provided the electrode for an electrochemical device as defined in the first or the second embodiment, wherein the dry electrode film has a tensile elongation of 2% or more.

According to the fourth embodiment of the present disclosure, there is provided the electrode for an electrochemical device as defined in any one of the first to the third embodiments, wherein the electrode film has a porosity of 20-50 vol %.

According to the fifth embodiment of the present disclosure, there is provided a method for manufacturing the electrode for an electrochemical device as defined in any one of the first to the fourth embodiments, the method including the steps of:

(a) preparing a powdery blend including an electrode active material, a conductive material and a binder resin;

(b) kneading the powdery blend at 70-200° C. to prepare mixture lumps;

(c) pulverizing the mixture lumps to obtain mixed powder for electrode; and (d) calendering the mixed powder for electrode to obtain a free-standing type dry electrode film, wherein the binder resin contained in the dry electrode film obtained from step (d) has a crystallinity (d) of 10% or less.

According to the sixth embodiment of the present disclosure, there is provided the method for manufacturing the electrode for an electrochemical device as defined in the fifth embodiment, wherein the binder resin contained in the mixed powder for electrode obtained from step (c) has a crystallinity (c) of 20% or less.

According to the seventh embodiment of the present disclosure, there is provided the method for manufacturing the electrode for an electrochemical device as defined in the fifth or the sixth embodiment, wherein the binder resin contained in the mixture obtained from step (a) has a crystallinity (a) of 50% or less.

According to the eighth embodiment of the present disclosure, there is provided the method for manufacturing the electrode for an electrochemical device as defined in any one of the fifth to seventh embodiments, wherein step (a) is carried out at 500-30,000 rpm.

According to the ninth embodiment of the present disclosure, there is provided the method for manufacturing the electrode for an electrochemical device as defined in any one of the fifth to the eighth embodiments, wherein step (b) is carried out under a rotation speed of 100 rpm or less.

According to the tenth embodiment of the present disclosure, there is provided the method for manufacturing the electrode for an electrochemical device as defined in any one of the fifth to the ninth embodiment, wherein step (b) is carried out under a pressure of 0.5 kgf/cm$^2$ to 10 kgf/cm$^2$.

According to the eleventh embodiment of the present disclosure, there is provided method for manufacturing the electrode for an electrochemical device as defined in any one of fifth to the tenth embodiment, wherein step (b) is carried out under a pressure of an atmospheric pressure or more.

According to the twelfth embodiment of the present disclosure, there is provided the electrode for an electrochemical device as defined in any one of the first to the fourth embodiments, wherein the binder resin includes polytetrafluoroethylene (PTFE), polyvinylidene fluoride (PVDF), polyolefin, or a mixture of two or more of them.

According to the thirteenth embodiment of the present disclosure, there is provided the electrode for an electrochemical device as defined in any one of the first to the fourth embodiments, which further includes a current collector, wherein the dry electrode film is disposed on at least one surface or both surfaces of the current collector.

According to the fourteenth embodiment of the present disclosure, there is provided the method for manufacturing the electrode for an electrochemical device as defined in any one of the fifth to the eleventh embodiments, which further includes a step of preparing a current collector, disposing the dry electrode film on at least one surface of the current collector and carrying out lamination.

According to the fifteenth embodiment of the present disclosure, there is provided a secondary battery including the dry electrode as defined in any one of the first to the fourth embodiments, wherein the dry electrode is a positive electrode, and an electrode assembly including the positive electrode, a negative electrode and a separator is received in a battery casing together with a lithium-containing non-aqueous electrolyte.

According to the sixteenth embodiment of the present disclosure, there is provided an energy storage system including the secondary battery as defined in the fourteenth embodiment as a unit cell.

According to the seventeenth embodiment of the present disclosure, there is provided a method for preparing mixed powder for electrode for manufacturing a dry electrode film, the method including the steps of:

(a) preparing a powdery blend including an electrode active material, a conductive material and a binder resin;

(b) kneading the powdery blend at 70-200° C. to prepare mixture lumps;

(c) pulverizing the mixture lumps to obtain mixed powder for electrode, wherein the binder resin contained in the mixed powder for electrode has a crystallinity of 20% or less, and the binder resin includes polytetrafluoroethylene (PTFE), polyolefin or a mixture thereof.

According to the eighteenth embodiment of the present disclosure, there is provided mixed powder for electrode, which is obtained by the method as defined in the seventeenth embodiment, and includes an electrode active material, a conductive material and a binder resin, wherein the binder resin includes polytetrafluoroethylene (PTFE), PVDF, polyolefin or a mixture of two or more of them, and the binder resin contained in the electrode mixture has a crystallinity of 20% or less.

According to the nineteenth embodiment of the present disclosure, there is provided a method for manufacturing a dry electrode film, including a step of calendering mixed powder for electrode to obtain a free-standing type dry electrode film, wherein the mixed powder for electrode is the same as defined in the seventeenth embodiment, and the binder resin contained in the dry electrode film has a crystallinity (d) of 10% or less.

According to the twentieth embodiment of the present disclosure, there is provided a dry electrode film which is obtained by the method as defined in the nineteenth embodiment, and has a tensile strength of 0.5 MPa or more in the machine direction (MD), a tensile elongation of 2% or more and a porosity of 20-50 vol %.

Advantageous Effects

The method for manufacturing a dry electrode according to the present disclosure uses a pulverization step after a high-temperature low-shear mixing step during the manufacture of mixed powder for electrode, and thus can minimize micronization of an active material and prevent cutting of a fibrilized binder. In addition, when manufacturing a dry electrode by using the mixed powder for electrode, it is possible to improve the mechanical properties, such as flexibility and strength, of the dry electrode.

Additionally, the method for manufacturing a dry electrode according to the present disclosure allows for determination of the micro-fibrilization degree of a binder resin and determination of whether each step is completed from the crystallinity of the binder resin during each step. Based on this, the processing conditions of the mixed powder for electrode or electrode film may be controlled. In this manner, it is possible to check and control the processing conditions and process completion timing easily and efficiently.

Further, the method for manufacturing a dry electrode according to the present disclosure includes a low-shear kneading step using a kneader and pulverization step. Therefore, the binder resin will be well micro-fibrillated, and there is no problem of blocking of a flow path caused by aggregation of the ingredients, which is favorable to mass production.

BEST MODE

Figure 1:
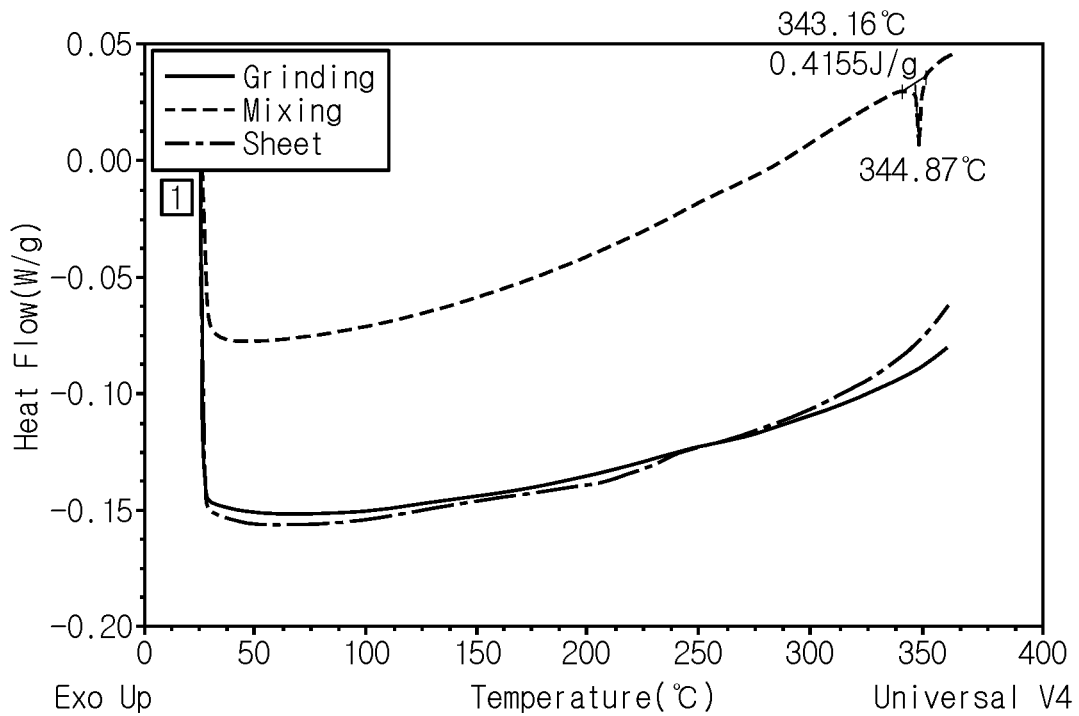
FIG. 1 is a graph illustrating the thermogravimetric analysis result using differential scanning calorimetry (DSC) according to Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

It will be further understood that the terms "comprises" and/or "comprising", or "includes" and/or "including" when used in this specification, do not preclude the presence of other elements but specify the additional presence of other elements, unless otherwise stated.

In one aspect of the present disclosure, there are provided an electrode for an electrochemical device and a method for manufacturing the same. For example, the electrochemical device may be a secondary battery, particularly a lithium-ion secondary battery.

According to the present disclosure, the electrode includes a dry electrode film obtained by a dry manufacturing process using no solvent for dispersing electrode ingredients during the manufacture of the electrode. The dry electrode film includes an electrode active material, a conductive material and a binder resin, and the binder resin contained in the dry electrode film has a crystallinity of 10% or less. For example, the crystallinity may be 5% or less.

When the crystallinity is 10% or less, the binder resin is highly fibrilized to ensure the flexibility of the dry electrode film. Therefore, as will be described later, it is easy to manufacture a strip-like dry electrode film in a calendering process wherein a roll-to-roll continuous process is applied. In addition, when the electrode film is wound into a roll shape or dewound after manufacturing the electrode film, the electrode film maintains its shape stably without any damage, such as breakage or cracking. Further, such a range of crystallinity is favorable to ensuring the binding force to the current collector to a predetermined level or higher.

In addition, according to the present disclosure, the dry electrode film preferably has a tensile strength of 0.5 MPa or more in the machine direction (MD). Meanwhile, the dry electrode film may have a tensile strength of 10.0 MPa or less, 5.0 MPa or less, or 3.0 MPa or less in the machine direction (MD). When the tensile strength satisfies the above range, sufficient mechanical strength can be secured when manufacturing a freestanding type dry electrode, so that manufacturing and handling are easy. On the other hand, when it does not reach the above range, the mechanical strength is weak and can be easily broken. On the other hand, when the tensile strength is excessively high, the tensile elongation is increased together, so that process efficiency is deteriorated as shown below, and the film thickness is not even.

Meanwhile, the dry electrode film preferably has a tensile elongation of 2% or more. The dry electrode film may have a tensile elongation of 30% or less, 20% or less, or 10% or less.

When the tensile elongation satisfies the above range, sufficient morphological stability and flexibility can be secured when manufacturing a freestanding type dry electrode, so manufacturing and handling are easy. When the tensile elongation is excessively low, flexibility and form stability are low, so the dry electrode film can easily break during manufacturing or transportation. On the other hand, when the tensile elongation exceeds the above range, the flexibility may increase excessively high, so that the dry electrode film may be excessively stretched between the rolls in the calendering process as described later, and the thickness of the obtained film may not be even.

Meanwhile, the dry electrode film may have a porosity of 20-50 vol %.

In another aspect of the present disclosure, there is provided a method for manufacturing the electrode. In the method for manufacturing the electrode, the crystallinity of the binder resin contained in the dry electrode film is controlled to 10% or less. In one aspect of the present disclosure, the crystallinity of the binder resin contained in the dry electrode film is 10% or less or absent (zero).

According to an embodiment, the method for manufacturing the electrode includes the steps of:
(a) preparing a powdery blend including an electrode active material, a conductive material and a binder resin;
(b) kneading the powdery blend to prepare mixture lumps;
(c) pulverizing the mixture lumps to obtain mixed powder for electrode; and
(d) calendering the mixed powder for electrode to obtain a free-standing type dry electrode film. On the other hand, in one embodiment of the present invention, step (b) may be performed under a temperature of 70° C. to 200° C. For example, the object (for example, powdery blend) to which the kneading process is applied may be controlled at a temperature of 70° C. to 200° C.

In the method, the binder resin in the powdery blend obtained from step (a) has a crystallinity (a) of 60% or less, preferably 50% or less. In addition, the binder resin in the mixed powder for electrode obtained from step (c) has a crystallinity (c) of 20% or less, and the binder resin contained in the dry electrode film obtained from step (d) has a crystallinity (d) of 10% or less.

In one embodiment of the present invention, the completion of the process of each step of (a) to (d) can be determined by measuring the crystallinity of the result obtained in each step. If the crystallinity degree of the binder resin in the product of each process step satisfies the predetermined degree of the crystallinity of each step, the present step is terminated and the next step is started.

Specifically, in step (a), when the crystallinity of the binder resin of the powdery blend is determined to be 60% or less, preferably 50% or less, the process of step (a) is terminated, and the obtained powdery blend is added to step (b).

In addition, in step (c), when the crystallinity of the binder resin in the mixed powder for electrodes is determined to be 20% or less, the process of step (c) is terminated, and the obtained mixed powder for electrodes is subsequently added to step (d).

In addition, in the step (d), when the crystallinity of the binder resin in the obtained dry electrode film satisfies 10% or less, the preparation is considered complete.

Alternatively, the process conditions for controlling the crystallinity to a desired predetermined value for each of steps (a), (b) and (d) may be experimentally established, and then the experimentally established predetermined process condition may be applied to each step.

According to the present disclosure, the crystallinity may be determined by using differential scanning calorimetry (DSC), and is based on the temperature (peak temperature) at a time point where the highest enthalpy is shown upon crystallization. Particularly, the crystallinity is a percentage (%) calculated by dividing the melting enthalpy ($\Delta H_m$) measured actually through DSC by the melting enthalpy ($\Delta H_m^0$) (equilibrium heat of melting) of the theoretically perfect crystals (crystallinity 100%) according to the following Mathematical Formula 1. Herein, reference will be made to Polymer Handbook (J. Brandrup et al., 2003) or academic journal, for example Polymer about the melting enthalpy value ($\Delta H_m^0$) of the theoretically perfect crystals of polymers. For example, the theoretical melting enthalpy value of a perfect crystal of PTFE is 85.4 J/g (Polymer 45, 2005, pp 8872-8882). Meanwhile, in general, thermal analysis of polymers such as DSC can be measured and calculated according to ASTM D3418-21.

$$X_c(\%) = (\Delta H_m \div \Delta H_m^0) \times 100 \quad \text{[Mathematical Formula 1]}$$

Hereinafter, the method for manufacturing the dry electrode according to the present disclosure will be explained in more detail.

First, a powdery blend including an electrode active material, a conductive material and a binder is prepared (step a).

Herein, the mixing for preparing the powdery blend is carried out in order to obtain a homogeneous blend of the electrode active material, the conductive material and the binder resin, and preferably to control the crystallinity of the binder resin in the resultant powdery blend to 50% or less. Since the ingredients are mixed in a powder state, the mixing method is not particularly limited but various methods may be used, as long as the method allows homogeneous mixing of the ingredients. However, since the present disclosure is directed to providing a dry electrode using no solvent, the mixing may be carried out by a dry mixing process. For example, the mixing may be carried out by introducing the ingredients to an instrument, such as a mixer or a blender.

According to an embodiment of the present disclosure, the mixing time is not particularly limited, but the mixing may be carried out for 1 second to 20 minutes. For example the mixing may be carried out for 1 second to 10 minutes. Meanwhile, the mixing speed is not particularly limited, but may be controlled suitably within a range of about 500 rpm-to 30,000 rpm. For example, the mixing speed is controlled within a range of 500 rpm to 20,000 rpm.

On the other hand, in one embodiment of the present invention, the temperature of the powdery blend may be controlled to 70° C. or less or 60° C. or less. When the mixing temperature exceeds 70° C., it may be difficult to obtain a uniform mixture due to adhesion of the materials to the mixing device. On the other hand, the lower limit of the temperature of the mixture is not particularly limited, and in one embodiment of the present invention, it may be carried out at a temperature of 20° C. or higher.

Particularly, the mixing may be carried out in a mixer at 500 rpm to 20,000 rpm for 30 seconds to 2 minutes, 70° C. or less, or 5,000-20,000 rpm for 30 seconds to 2 minutes, 70° C. or less, specifically at 1000 rpm to 15,000 rpm or 10,000-15,000 rpm for 30 seconds to 1 minute or 30 sec to 7 min, under the temperature of 60° C. or less, with a view to high homogeneity and controlling the crystallinity of the binder resin.

According to the present disclosure, the crystallinity of the binder resin in the blend obtained from the mixing step is 60% or less, preferably 50% or less. Meanwhile, when the crystallinity of the binder resin in the resultant blend is larger than 60% or larger than 50%, it is preferred to extend the mixing time and/or rotation speed (rpm), to pulverize binder lumps to primary particles in order to prevent aggregation of the binder lumps and to carry out coarse fibrilization partially.

If the degree of crystallinity of the powdery blend obtained in step (a) does not fall within the above range and is not high, fiberization of the binder resin is not easy in the low shear kneading process (step b) described later. In addition, the fibers may not be sufficiently formed on the surface of the binder or the process time required for fiberization of the binder resin may be increased.

On the other hand, when the mixing time is excessively long, the mixing speed is excessively high, or both, there is a risk that the electrode active material is micronized/damaged or the fibers are rather cut. Together/or independently of this, there is a risk that the nonuniformity of binder fiberization may be incurred. In consideration of this point, in one embodiment of the present invention, the crystallinity of the binder resin in the powdery blend may be controlled to 30% or more, 35% or more, or 40% or more.

According to the present disclosure, the binder resin is not particularly limited, as long as it can be fibrilized by step (a) and/or step (b).

Meanwhile, the binder resin may be fiberized in step (a), but the fiber formed in step (a) is thick and it is difficult to thin enough to achieve the tensile elongation and tensile strength required for the dry electrode. In the present invention, preferably, the micro fibrillization of the binder resin is mainly performed through (b), which will be described later.

The fibrilization refers to treatment of finely dividing a polymer, and for example, may be carried out by using mechanical shear force, or the like. The fibrilized polymer fibers generate a lot of micro-fibers (fibrils) through the surface disintegration. Non-limiting examples of the binder resin may include polytetrafluoroethylene (PTFE), polyvinylidene fluoride (PVDF), polyolefin, or a mixture of two or more of them, particularly, the binder resin includes polytetrafluoroethylene (PTFE), and more particularly, the binder resin is polytetrafluoroethylene (PTFE). Particularly, the polytetrafluoroethylene (PTFE) may be used in an amount of 30 wt % or more based on the total weight of the binder resin. Meanwhile, besides the above-mentioned ingredients, the binder resin may further include polyethylene oxide (PEO) and/or polyvinylidene fluoride-co-hexafluoropropylene (PVDF-HFP).

The dry electrode may be a positive electrode, and the electrode active material may be a positive electrode active material.

The positive electrode active material may include any one selected from lithium transition metal oxides, lithium metal iron phosphorus oxides and metal oxides, and is not particularly limited. Particular examples of the positive electrode active material include at least one selected from: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3), such as Li(Ni, Co, Mn, Al)$O_2$, wherein the fraction of Ni is 50% or more of the metals except Li; lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; lithium metal phosphorous oxides $LiMPO_4$ (wherein M is Fe, Co, Ni or Mn); disulfide compounds; and $Fe_2(MoO_4)_3$; or the like. However, the scope of the present disclosure is not limited thereto.

In a variant, the dry electrode may be a negative electrode, and the active material may be a negative electrode active material. Particular examples of the negative electrode active material include: carbon such as non-graphitizable carbon or graphite-based carbon; metal composite oxides, such as $Li_xFe_2O_3$ (0≤x≤1), $Li_xWO_2$ (0≤x≤1) and $Sn_xMe_{1-x}Me'_yO_z$ (Me:Mn, Fe, Pb, Ge; Me':Al, B, P, Si, elements of Group 1, 2 or 3 in the Periodic Table, halogen; 0<x≤1; 1≤y≤3; 1≤z≤8); lithium metal; lithium alloy; silicon-based alloy; tin-based alloy; silicon oxides, such as SiO, SiO/C and $SiO_2$; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like.

More particularly, the dry electrode may be a positive electrode. Therefore, the active material may be a positive electrode active material, and particular examples thereof include lithium transition metal oxides, lithium nickel-manganese-cobalt oxides, lithium nickel-manganese-cobalt oxide partially substituted with other transition metals, lithium iron phosphorus oxides, or the like.

The conductive material is not particularly limited, as long as it has conductivity while not causing any chemical change in the corresponding battery. Particular examples of the conductive material include: graphite, such as natural graphite or artificial graphite; carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whisker, such as zinc oxide or potassium titanate; conductive metal oxide, such as titanium dioxide; conductive polymer such as a polyphenylene derivative; or the like. Particularly, the conductive material may include at least one selected from the group consisting of activated carbon, graphite, carbon black and carbon nanotubes, and more particularly, activated carbon, with a view to homogeneous mixing of the conductive material and improvement of conductivity.

The mixing ratio of the electrode active material, conductive material and the binder resin may be 80-98 wt %: 0.5-10 wt %: 0.5-10 wt % (active material:conductive material:binder), particularly, 85-98 wt %: 0.5-5 wt %: 0.5-10 wt %.

When the binder resin content is excessively high beyond the above-defined range, the binder resin may be fibrilized excessively during the subsequent kneading step, thereby adversely affecting the overall process. When the binder content is excessively low, it is not possible to carry out sufficient fibrilization, and thus the ingredients cannot be aggregated to such a degree that the ingredients form mixture lumps, the dry electrode film is manufactured hardly, or the physical properties of the dry electrode film is degraded undesirably.

In addition, when the content of the conductive material is excessively high beyond the above-defined range, the content of the active material is reduced relatively, resulting in a decrease in capacity. When the content of the conductive material is excessively low, sufficient conductivity cannot be ensured, or the physical properties of the dry electrode film is degraded undesirably.

Meanwhile, a filler as an ingredient for inhibiting electrode swelling may be further introduced optionally to the blend. The filler is not particularly limited, as long as it is a fibrous material, while not causing any chemical change in the corresponding battery. Particular examples of the filler include: olefinic polymers, such as polyethylene or polypropylene; fibrous materials, such as glass fibers or carbon fibers; or the like.

In one embodiment of the present invention, the crystallinity of the binder resin in the powdery blend obtained in step (a) is checked, and when the measured crystallinity is 60% or less, preferably 50% or less, step (a) is terminated, then the obtained product may be added to step (b). The crystallinity may be measured at each step while the (a) to (d) processes are performed.

Alternatively, in another embodiment, the process condition for the step (a) wherein the crystallinity of the binder resin of the powdery blend can be controlled to 60% or less, or 50% or less is developed experimentally and then the experimentally developed predetermined process conditions can be applied to step (a).

Next, the blend obtained as described above is subjected to a kneading step to fibrilize the binder resin (step b).

In this kneading step, since a relatively low shear force and relatively high temperature is applied as described later, there is no concern such as micronization/damage of the electrode active material or cutting of the binder fiber, and mixed particles for the electrode in which the binder resin is miro-fibrillized can be obtained. In addition, the fibrillized binder has high uniformity in the thickness and/or length of the fibers.

The kneading method is not particularly limited. According to an embodiment of the present disclosure, the kneading may be carried out by using a kneader. For example, as the kneader, a twin screw extruder, a single screw extruder, a batch kneader, a continuous kneader, etc. may be used.

The kneading step is configured to bind or interconnect the electrode active material and conductive material powder particles, while the binder resin is fibrilized, so that mixture lumps (blend lumps) having a solid content of 100% may be formed.

Particularly, the kneading in step (b) may be carried out at a rate controlled to 10-100 rpm. For example, the kneading may be carried out at a rate controlled to 20-70 rpm, within the above-defined range. For example, the kneading may be carried out for 1-30 minutes. For example, the kneading may be carried out at a rate of 20-70 rpm for 3-10 minutes, within the above-defined ranges. Meanwhile, the kneading may be carried out at a shear rate controlled to 5/s to 1,000/s. According to an embodiment of the present disclosure, the kneading may be carried out for 1-30 minutes, and the shear rate may be controlled to a range of 10/s to 500/s.

In addition, the kneading step may be carried out at high temperature under a pressure condition equal to or higher than ambient pressure.

Particularly, the kneading may be carried out at 70-200° C., specifically 90-150° C. The temperature may be the temperature inside the kneader or the temperature of the object to be kneaded. Alternatively, the temperature of both may be controlled within the above range.

When the kneading is carried out at a low temperature below the above-defined temperature range, it is not possible to perform fibrilization of the binder during the kneading and lump formation through the kneading sufficiently. As a result, it is not possible to form a film with ease during calendering. On the other hand, when the kneading is carried out at an excessively high temperature, the binder may be fibrilized rapidly, and the resultant fibers may be cut by excessive shear force, undesirably.

In addition, the kneading may be carried out under a pressure of 0.5 kgf/cm$^2$ to 10 kgf/m$^2$, particularly 1 kgf/cm$^2$ to 8 kgf/cm$^2$, for example ambient pressure or more and 8 kgf/m$^2$ or less. When the kneading is carried out under an excessively high pressure beyond the above-defined pressure range, there are problems in that the resultant fibers may be cut due to the application of excessive shear force and pressure and the mixture lumps may have excessively increased density, undesirably. In other words, according to the present disclosure, it is possible to accomplish desired effects, when a low-shear mixing step is carried out at high temperature under a pressure condition equal to or higher than ambient pressure, instead of high-shear keading. Alternatively the kneading may be carried out under a pressure of ambient pressure or more, particularly 1-3 atm, or 1.1-3 atm.

Meanwhile, in one embodiment of the present invention, the process conditions in the kneading step may be controlled according to the characteristics of the material used in the present invention. In a specific embodiment, the process conditions may be appropriately adjusted according to the particle diameter of the electrode active material particles. When the particle diameter of the electrode active material particles is large, fiberization may proceed relatively easily compared to the electrode active material having a small particle diameter. Accordingly, when the particle diameter of the electrode active material is large, a relatively low rotation speed and/or shear rate may be applied, and when the particle diameter is small, a relatively large rotation speed and/or shear speed may be applied. On the other hand, even in the case of temperature or pressure, it may be adjusted in consideration of these material properties.

Then, the mixture lump obtained from the kneading step (b) is pulverized to obtain mixed powder for an electrode (step c).

Particularly, the mixture lump prepared through the kneading step (b) may be directly subjected to calendering to prepare a sheet. However, in this case, it is required to press the mixture lumps under strong pressure at high temperature to convert them into a thin film. As a result, there are problems in that the dry electrode film may have excessively high density or a uniform film cannot be obtained in term of thickness or density. Therefore, according to the present disclosure, the mixture lumps obtained step (b) are subjected to a pulverization step.

Herein, the pulverization step may be carried out by using a known pulverizing instrument, such as a blender or a grinder, but is not particularly limited thereto. According to an embodiment of the present disclosure, the pulverization step may be carried out at a rate controlled to 100 rpm to 30,000 or 3,000-30,000 rpm. Meanwhile, the pulverization time may be controlled suitably within a range of 1 second to 10 minutes. However, the pulverization rate and time are not limited to the above-defined ranges. Particularly, the pulverization may be carried out at a rate of 500 rpm to 20,000 rpm or 5,000-20,000 rpm for 30 seconds to 10 minutes, or 700 rpm to 18,000 rpm, or 10,000-18,000 rpm for 30 second to 5 minutes or 30 seconds to 1 minute.

When the pulverization is carried out at an excessively low rpm or for an excessively short time beyond the above-defined ranges, it is not possible to carry out pulverization sufficiently, resulting in the problem of generation of powder having a size inadequate to form a film. When the pulverization is carried out at an excessively high rpm or for an excessively long time, a lot of fine powder may be generated from the mixture lumps undesirably.

In one embodiment of the present invention, in consideration of the aspect of film formation, the particle diameter of the electrode mixture powder obtained in step (c) may preferably range from 30 μm to 180 μm.

In one embodiment of the present invention, the particle size may be measured by applying a particle size distribution analyzer (PSA) (Model Mastersizer 300, Malvem Instruments LTD). Specifically, the laser is irradiated, and the incident laser detects the degree of light scattering scattered by the particles, thereby measuring the particle size. As the measurement method, a wet method in which particles are dispersed in a solvent for measurement and a dry method in which the particles are measured in a powder state may be applied.

Meanwhile, according to the present disclosure, the binder resin contained in the mixed powder for electrode has a crystallinity (c) of 20% or less, which is lower than the crystallinity (a) of the binder resin contained in the powdery blend. On the other hand, it can be higher than the crystallinity (d) of the binder resin contained in the dry electrode film after calendering. That is, the crystallinity can be lowered through the calendaring step.

When the binder resin has a crystallinity (c) of higher than 20%, it is difficult to obtain films having uniform quality in the subsequent calendering step. If the resultant mixed powder for electrode has a crystallinity of higher than 20%, the kneading time may be controlled, and for example, primary fibrilation of the binder resin may be carried out by controlling the process condition, for example, at least one of the kneading time, temperature, rotation speed (rpm) and shear-rate so that the crystallinity may be controlled. For example, the kneading time can be increased to carry out the binder resin fibrillization and control the crystallinity of the binder resin.

In one embodiment of the present invention, the crystallinity (c) of the binder resin in the mixed powder for electrodes obtained in step (c) is preferably 20% or less. When the degree of crystallinity (c) exceeds 20%, fiberization is not sufficient, and the tensile strength and tensile elongation of the dry electrode obtained through the calendering process may be reduced as described later.

In one embodiment of the present invention, the crystallinity of the binder resin in the mixed powder for electrode obtained in step (c) is measured, and when the measured crystallinity is 20% or less, step (c) is terminated, then the obtained product may be added to step (d). The crystallinity may be measured at each step while the (a) to (d) processes are performed.

Alternatively, in another embodiment, the process condition for the step (c) wherein the crystallinity of the binder resin of the mixed powder can be controlled to 20% or less is developed experimentally and then the predetermined process conditions can be applied to step (c).

Once the mixed powder for electrode is obtained in the above-described manner, the mixed powder for electrode is used to manufacture a dry electrode (step d). Particularly, the mixed powder for an electrode obtained by finishing the pulverization step is subjected to calendering to obtain a dry electrode film.

The calendering refers to processing the mixed powder for an electrode into a film shape. For example, the calendering step may be a step of pressing the powder for an electrode into a film shape having an average thickness of 50-300 µm.

According to an embodiment of the present disclosure, the calendering may be carried out by using a calendering device including a roll press unit having two rollers facing each other. The calendering device may include at least one roll press unit. For example, multiple roll press units may be disposed continuously to perform multiple steps of pressing the mixed powder for electrode. Meanwhile, at least one of the roller, each independently, in calendaring device may have a temperature of 50-200° C. In combination with this or independently from this, the two rollers in at least one of the roll press unit may have a rotation speed ratio controlled to 1:1-1:3.

After carrying out the calendering step, a dry electrode film functioning as an electrode mixture may be prepared. Such a dry electrode film also called a 'free-standing film' or self-supporting film.

Such a dry electrode film may have sufficient mechanical strength to be used in the manufacturing process of an energy storage device without any external support element such as a current collector, support web, or other structure. Alternatively, it may be combined with a support member such as a current collector and used to manufacture a battery.

Meanwhile, according to an embodiment of the present disclosure, the binder resin in the resultant dry electrode film shows a crystallinity (d) of 10% or less. When the dry electrode film shows a crystallinity of higher than 10%, the crystallinity may be controlled by adjusting the gap or speed ratio between the two rollers of the roll press unit. For example, the fibrilization degree of the binder may be increased by reducing the gap and/or by increasing the speed ratio.

In one embodiment of the present invention, the crystallinity of the binder resin in the dry electrode film obtained in step (d) is measured, and when the measured crystallinity is 10% or less, step (d) is terminated. The crystallinity may be measured at each step while the (a) to (d) processes are performed.

Alternatively, in another embodiment, the process condition for the step (d) wherein the crystallinity of the binder resin of the dry electrode film can be controlled to 10% or less is developed experimentally and then the predetermined process conditions can be applied to step (d).

The resultant dry electrode film contains no solvent, and thus shows little flowability. Thus, the dry electrode film may be handled with ease and may be processed into a desired shape to be used for manufacturing various types of electrodes. In addition, when using the dry electrode film according to the present disclosure to manufacture an electrode, a drying step for removing a solvent may be eliminated. Therefore, it is possible to significantly improve the manufacturing processability of electrodes and to solve the problems, such as micronization of an active material or cutting of a fibrilized binder, occurring in the method for manufacturing a dry electrode according to the related art.

In addition, the binder resin contained in the dry electrode film according to the present disclosure shows a crystallinity controlled to 10% or less and has increased flexibility. Therefore, when the dry electrode film is wound and stored, or dewound again, it causes no breakage or cracking advantageously. Further, it is possible to improve the mechanical strength, such as tensile strength and tensile elongation, by virtue of such increased flexibility.

Meanwhile, according to the present disclosure, the dry electrode film may have a porosity of 20-50%. Within the above-defined range, the porosity may be controlled to 45% or less, or 40% or less. When the porosity satisfies the above-defined range, there are provided various advantages. On the other hand, when the porosity is excessively low beyond the above-defined range, it is difficult to impregnate the dry electrode film with an electrolyte, which is not preferred in terms of life and output characteristics. When the porosity is excessively high, the volume of the dry electrode film required for realizing the same capacity is increased, which is not preferred in terms of energy density per unit volume. According to an embodiment of the present disclosure, the porosity may be calculated from the following Mathematical Formula 2 by using the actual density calculated based on the actual density and composition of each ingredient, after measuring the apparent density of the dry electrode film:

$$\text{Porosity}(\%) = \{1 - (\text{Apparent density}/\text{Actual density})\} \times 100 \quad \text{[Mathematical Formula 2]}$$

Then, according to the present disclosure, a lamination step of forming the dry electrode film on at least one surface of the current collector may be carried out, after the calendering. The lamination step may be a step of pressing and attaching the dry electrode film onto a current collector. The lamination may also be carried out by using a lamination roll, wherein the lamination roll may be maintained at a temperature of 20-200° C.

Meanwhile, according to an embodiment of the present disclosure, the dry electrode obtained as described above may have a flexing resistance of less than 10 mmφ, particularly, a flexing resistance of 8 mmφ or less, and more particularly, 5 mmφ or less. As described above, the dry electrode film according to the present disclosure causes less cutting of the fibrilized binder, and thus can provide improved flexibility. The flexing resistance may be determined by the standard method as defined in JIS K5600-5-1. Particularly, the flexing resistance may be determined by allowing the dry electrode to be in contact with test rods having different diameters and lifting both ends to determine whether cracking occurs or not and to measure the minimum diameter with which no cracking occurs.

In addition, the electrode active material loading amount of the dry electrode film may be 3-15 mAh/cm$^2$, particularly 4-10 mAh/cm$^2$.

Herein, the electrode active material loading amount is a value calculated according to the following Mathematical Formula 3:

electrode Active material loading amount (mAh/cm$^2$)=Capacity(mAh/g) of electrode active material×Weight ratio(wt %) of electrode active material in dry electrode film×Weight per unit area(g/cm$^2$) of dry electrode film [Mathematical Formula 3]

Meanwhile, the current collector is not particularly limited, as long as it has high conductivity, while not causing any chemical change in the corresponding battery. Particular examples of the current collector include stainless steel, aluminum, nickel, titanium, baked carbon, copper or stainless steel surface-treated with carbon, nickel, titanium, silver, or the like. In addition, fine surface irregularities may be formed on the surface of the current collector to enhance the binding force with the positive electrode active material. The current collector may be used in various shapes, including a film, a sheet, a foil, a net, a porous body, a foamed body, a non-woven web, or the like.

Further, the current collector may be totally or partially coated with a conductive primer in order to reduce the surface resistance and to improve the adhesion. Herein, the conductive primer may include a conductive material and a binder. The conductive material is not particularly limited, as long as it has conductivity, and particular examples thereof include carbonaceous materials. The binder may include a fluorine-based binder (including PVDF and PVDF copolymers), which is soluble in a solvent, an acrylic binder, an aqueous binder, or the like.

In still another aspect of the present disclosure, there is provided a dry electrode obtained by the method for manufacturing a dry electrode. The electrode further includes a current collector, wherein the dry electrode film is disposed on at least one surface or both surfaces of the current collector. There are also provided a secondary battery including the dry electrode, wherein the dry electrode is a positive electrode, and an electrode assembly including the positive electrode, a negative electrode and a separator is received in a battery casing together with a lithium-containing non-aqueous electrolyte, and an energy storage system including the secondary battery as a unit cell.

Herein, the structure of the secondary battery and that of the energy storage system are the same as known to those skilled in the art, and description thereof will be omitted herein.

In yet another aspect of the present disclosure, there is provided a system for manufacturing a dry electrode. The system includes: a blender unit configured to mix ingredients of a mixture including an electrode active material, a conductive material and a binder resin; a kneader unit configured to knead the mixture to prepare mixture lumps; a pulverizer unit configured to pulverize the mixture lumps to form mixed powder for an electrode; a calender unit configured to form the powder for an electrode into a dry electrode film; and a lamination unit configured to laminate the dry electrode film with a current collector.

Each unit of the system and each step carried out by the device may be set preliminarily to processing conditions which allow the binder resin to realize the above-defined crystallinity in each step.

In addition, a sample may be taken after carrying out each step to determine the crystallinity, and then when the crystallinity does not meet the standard, the pre-set processing conditions may be corrected.

For example, when the crystallinity of the powdery blend obtained from the blender unit is higher than 50% after determining the crystallinity, or when the crystallinity of the mixed powder for electrode is higher than 20% after determining the crystallinity, the processing time in each step may be increased. In addition, when the crystallinity of the electrode film obtained after the calendering step is higher than 10%, the crystallinity may be controlled by reducing the gap between the rollers in the roll press unit, or by increasing the speed ratio of the rollers.

The blender unit is a mixer configured to mix the ingredients. As described above, the ingredients of the mixture may be mixed at a rate of 500-30,000 rpm. The kneader unit is configured to form the blend into mixture lumps through kneading and to perform fibrilization of the binder. For this purpose, the kneader unit may be set to a temperature of 70-200° C. and a pressure condition equal to or higher than ambient pressure. Particularly, the kneader unit may be set to 90-150° C. and 0.5 kgf/cm$^2$ to 10 kgf/cm$^2$ more particularly, 1 kgf/cm$^2$ to 8 kgf/cm$^2$.

The pulverizer unit is configured to pulverize the mixture limps obtained from the kneader unit to form powder for an electrode, and may include a blender or a grinder.

The calender unit is configured to press the powder for an electrode so that it may be molded into a film shape. According to an embodiment of the present disclosure, the calender may include a roll press unit having two rollers facing each other, wherein multiple roll press units may be disposed continuously to perform multiple steps of pressing the powder The lamination unit functions to attach and press the dry electrode film formed by the calender unit onto at least one surface of a current collector. For example, the lamination unit may include a roll press unit.

The porosity of the dry electrode film according to the present disclosure may be determined by the calender and the lamination roll. The structures of the blender unit, kneader unit, calender unit and lamination unit are generally known to those skilled in the art, and detailed description thereof will be omitted herein.

Figure 3:
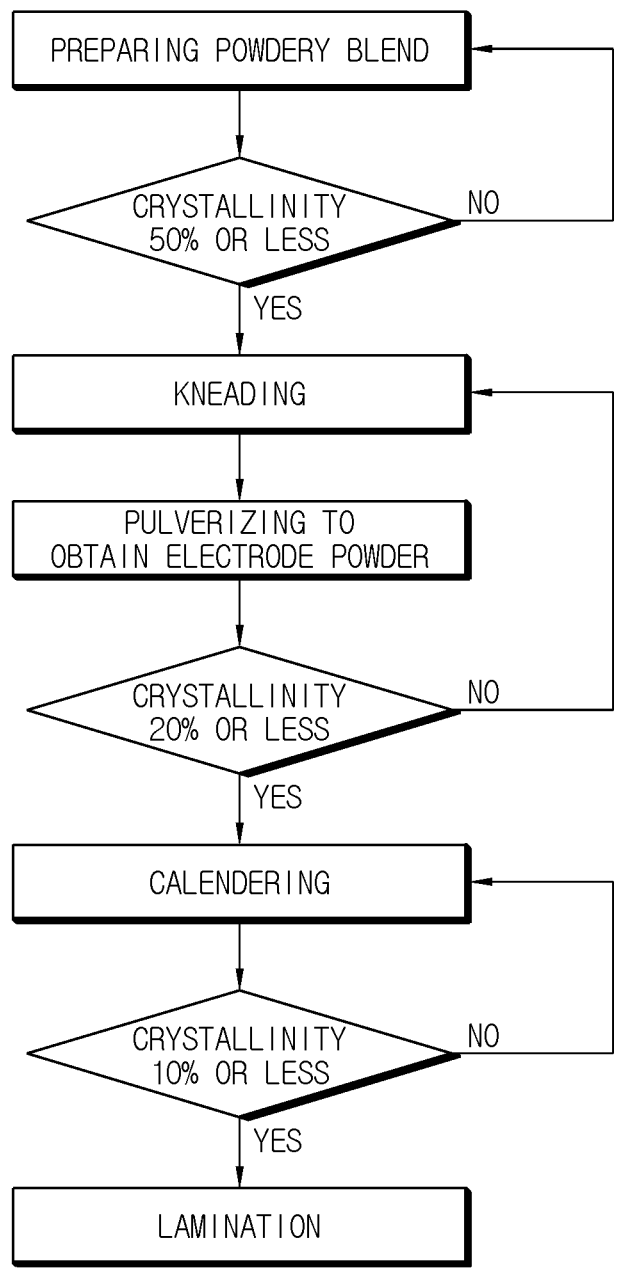
FIG. 3 is a flow chart illustrating the manufacture of the dry electrode according to the present disclosure.

FIG. 3 is a flow chart illustrating the manufacture of the dry electrode according to the present disclosure. Referring to FIG. 3, first, an electrode active material, a binder resin and a conductive material are blended to prepare a powdery blend, and the crystallinity of the binder resin is determined. If the crystallinity of the binder resin is 50% or less, the powdery mixture is introduced to the next kneading step. However, if the crystallinity is higher than 50%, the powdery mixture may be further subjected to the blending step to extend the mixing time. Herein, binder lumps may be pulverized into primary particles and coarse fibrilization may be performed.

Next, the resultant powdery blend is kneaded to obtain mixture lumps, which, in turn is pulverized to obtain mixed powder for electrode. If the binder resin in the resultant mixed powder for electrode shows a crystallinity of 20% or less, the mixed powder for electrode is introduced to the next calendering step. However, if the crystallinity is higher than 20%, the mixed powder for electrode is introduced back to the kneading step.

Then, the resultant mixed powder for electrode is subjected to calendering to obtain a dry electrode film. If the binder resin in the resultant dry electrode film shows a crystallinity of 10% or less, the dry electrode film is introduced to a lamination step to obtain an electrode. However, when the crystallinity is higher than 10%, the gap between the rollers, the speed ratio of the rollers or both are adjusted to control the crystallinity. Meanwhile, the flow chart as shown in FIG. 3 may also be used to establish the processing conditions for satisfying the crystallinity required for each step during the manufacture of the electrode.

Hereinafter, the present disclosure will be explained in detail with reference to Examples, Comparative Examples and Test Examples so that the present disclosure will fully convey the scope of the present disclosure to those skilled in the art.

Example 1

First, Li(Ni, Co, Mn, Al)$O_2$ as a positive electrode active material, activated carbon and polytetrafluoroethylene (PTFE) were introduced to a blender at a weight ratio of 96:1:3, and then mixed therein at 15,000 rpm for 1 minute to prepare a powdery blend. Next, a kneader was stabilized at a temperature of 150° C., the mixture was introduced to the kneader, and the kneader was operated under 1 kgf/$cm^2$ at a rate of 25 rpm for 5 minutes to obtain mixture lumps. The mixture lumps were introduced to a blender and pulverized at 10,000 rpm for 30 seconds to obtain mixed powder for electrode. Then, the mixed powder for electrode was introduced to a lab calender (roll diameter: 200 mm, roll temperature: 100° C., roll speed ratio: 1.5) to obtain a dry electrode film. The particle size of the positive electrode active material ranges about 5 um to 12 um.

Example 2

First, lithium iron phosphate (LFP) as a positive electrode active material, activated carbon and polytetrafluoroethylene (PTFE) were introduced to a blender at a weight ratio of 94:1.5:4.5, and then mixed therein at 10,000 rpm for 1 minute to prepare a powdery blend. Next, a kneader was stabilized at a temperature of 150° C., the mixture was introduced to the kneader, and the kneader was operated under 1 kgf/$cm^2$ at a rate of 50 rpm for 5 minutes to obtain mixture lumps. The mixture lumps were introduced to a blender and pulverized at 10,000 rpm for 20 seconds to obtain mixed powder for electrode. Then, the mixed powder for electrode was introduced to a lab calender (roll diameter: 200 mm, roll temperature: 100° C., roll speed ratio: 1.75) to obtain a dry electrode film. The particle size of the positive electrode active material ranges about 2 um to 3 um.

Example 3

First, Li(Ni, Co, Mn, Al)$O_2$ as a positive electrode active material, activated carbon and polytetrafluoroethylene (PTFE) were introduced to a blender at a weight ratio of 96:1:3, and then mixed therein at 15,000 rpm for 1 minute to prepare a powdery blend. Next, a kneader was stabilized at a temperature of 150° C., the mixture was introduced to the kneader, and the kneader was operated under 1 kgf/$cm^2$ at a rate of 25 rpm for 2 minutes to obtain mixture lumps. The mixture lumps were introduced to a blender and pulverized at 10,000 rpm for 30 seconds to obtain mixed powder for electrode. Then, the mixed powder for electrode was introduced to a lab calender (roll diameter: 200 mm, roll temperature: 100° C., roll speed ratio: 1.5) to obtain a dry electrode film. The particle size of the positive electrode active material ranges about 5 um to 12 um.

Comparative Example 1

First, lithium iron phosphate (LFP) as a positive electrode active material, activated carbon and polytetrafluoroethylene (PTFE) were introduced to a blender at a weight ratio of 94:1.5:4.5, and then mixed therein at 10,000 rpm for 1 minute to prepare a powdery blend. Next, a kneader was stabilized at a temperature of 150° C., the mixture was introduced to the kneader, and the kneader was operated under 1 kgf/$cm^2$ at a rate of 25 rpm for 2 minutes to obtain mixture lumps. The mixture lumps were introduced to a blender and pulverized at 10,000 rpm for 20 seconds to obtain mixed powder for electrode. Then, the mixed powder for electrode was introduced to a lab calender (roll diameter: 200 mm, roll temperature: 100° C., roll speed ratio: 1.75) to obtain a dry electrode film. The particle size of the positive electrode active material ranges about 2 um to 3 um.

Comparative Example 2

First, Li(Ni, Co, Mn, Al)$O_2$ as a positive electrode active material, activated carbon and polytetrafluoroethylene (PTFE) were introduced to a blender at a weight ratio of 96:1:3, and then mixed therein at 400 rpm for 2 minute to prepare a powdery blend. Next, a kneader was stabilized at a temperature of 150° C., the mixture was introduced to the kneader, and the kneader was operated under 1 kgf/$cm^2$ at a rate of 25 rpm for 5 minutes to obtain mixture lumps. The mixture lumps were introduced to a blender and pulverized at 10,000 rpm for 30 seconds to obtain mixed powder for electrode. Then, the mixed powder for electrode was introduced to a lab calender (roll diameter: 200 mm, roll temperature: 100° C., roll speed ratio: 1.5) to obtain a dry electrode film. The particle size of the positive electrode active material ranges about 5 um to 12 um.

Comparative Example 3

First, Li(Ni, Co, Mn, Al)O$_2$ as a positive electrode active material, activated carbon and polytetrafluoroethylene (PTFE) were introduced to a blender at a weight ratio of 96:1:3, and then mixed therein at 15,000 rpm for 1 minute and put the resultant into a super mixer and mixed therein at 800 rpm for 30 sec to prepare a powdery blend. In the two steps, the temperature was controlled under 23° C. and the pressure was controlled under 85 psi. Then, the powdery blend was introduced to a lab calender (roll diameter: 200 mm, roll temperature: 100° C., roll speed ratio: 1.5) to obtain a dry electrode film. The particle size of the positive electrode active material ranges about 5 um to 12 um.

TABLE 1

| | Ingredients | Binder content (wt %) | Shear rate (sec$^{-1}$, in kneading stpe) | Tm (° C.) | ΔHm (J/g) | ΔHm expressed based on 100% of binder (J/g) | Crystallinity (%) ΔHm/ΔHm° | Tensile strength (MD, Mpa) | Tensile elongation (%) |
|---|---|---|---|---|---|---|---|---|---|
| Ex. 1 | Binder 1 | 100 | | 348.3 | 72.399 | 72.399 | 84.78 | | |
| | Powdery blend | 3 | | 347.1 | 1.138 | 37.933 | 44.42 | | |
| | Mixed powder for electrode | 3 | 48 | — | — | — | 0 | | |
| | Dry electrode film | 3 | | — | — | — | 0 | 1.87 | 5.8 |
| Ex. 2 | Binder 2 | 100 | | 347.3 | 72.974 | 72.974 | 85.45 | | |
| | Powdery blend | 4.5 | | 346.58 | 1.776 | 39.458 | 46.20 | | |
| | Mixed powder for electrode | 4.5 | 240 | 346.94 | 0.205 | 4.561 | 5.34 | | |
| | Dry electrode film | 4.5 | | 347.11 | 0.109 | 2.431 | 2.85 | 0.70 | 2.1 |
| Ex. 3 | Binder 1 | 100 | | 348.3 | 72.399 | 72.399 | 84.78 | | |
| | Powdery blend | 3 | | 347.1 | 1.138 | 37.933 | 44.42 | | |
| | Mixed powder for electrode | 3 | 48 | 348.3 | 0.3505 | 11.683 | 13.68 | | |
| | Dry electrode film | 3 | | — | — | — | 0 | 0.98 | 4.6 |

TABLE 2

| | Ingredients | Binder content (wt %) | Shear rate (sec$^{-1}$, in kneading stpe) | Tm (° C.) | ΔHm (J/g) | ΔHm expressed based on 100% of binder (J/g) | Crystallinity (%) ΔHm/ΔHm° | Tensile strength (MD, Mpa) | Tensile elongation (%) |
|---|---|---|---|---|---|---|---|---|---|
| Compartive Ex. 1 | Binder 1 | 100 | | 347.3 | 72.974 | 72.974 | 85.45 | | |
| | Powdery blend | 4.5 | | 346.58 | 1.776 | 39.458 | 46.20 | | |
| | Mixed powder for electrode | 4.5 | 48 sec-1 | 345.06 | 0.874 | 19.416 | 22.74 | | |
| | Dry electrode film | 4.5 | | | | | — | 0 Cannot be formed into film | 0 |
| Compartive Ex. 2 | Binder 2 | 100 | | 348.3 | 72.399 | 72.399 | 84.78 | | |
| | Powdery blend | 3 | | 347.0 | 1.6625 | 55.417 | 64.89 | | |
| | Mixed powder for electrode | 3 | 48 sec-1 | 346.8 | 0.6866 | 22.887 | 26.49 | | |
| | Dry electrode film | 3 | | — | — | — | — | 0 Cannot be formed into film | 0 |

TABLE 2-continued

| | Ingredients | Binder content (wt %) | Shear rate (sec⁻¹, in kneading stpe) | Tm (° C.) | ΔHm (J/g) | ΔHm expressed based on 100% of binder (J/g) | Crystallinity (%) ΔHm/ΔHm° | Tensile strength (MD, Mpa) | Tensile elongation (%) |
|---|---|---|---|---|---|---|---|---|---|
| Comparative Ex. 3 | Binder 1 | 100 | | 348.3 | 72.399 | 72.399 | 84.78 | ☐ | ☐ |
| | Powdery blend Mixed powder for electrode | 3 | | 347.1 | 1.2 | 39.96 | 32.53 | ☐ | ☐ |
| | Dry electrode film | 3 | | — | — | — | — | 0 Cannot be formed into film | ☐0 |

Figure 2:
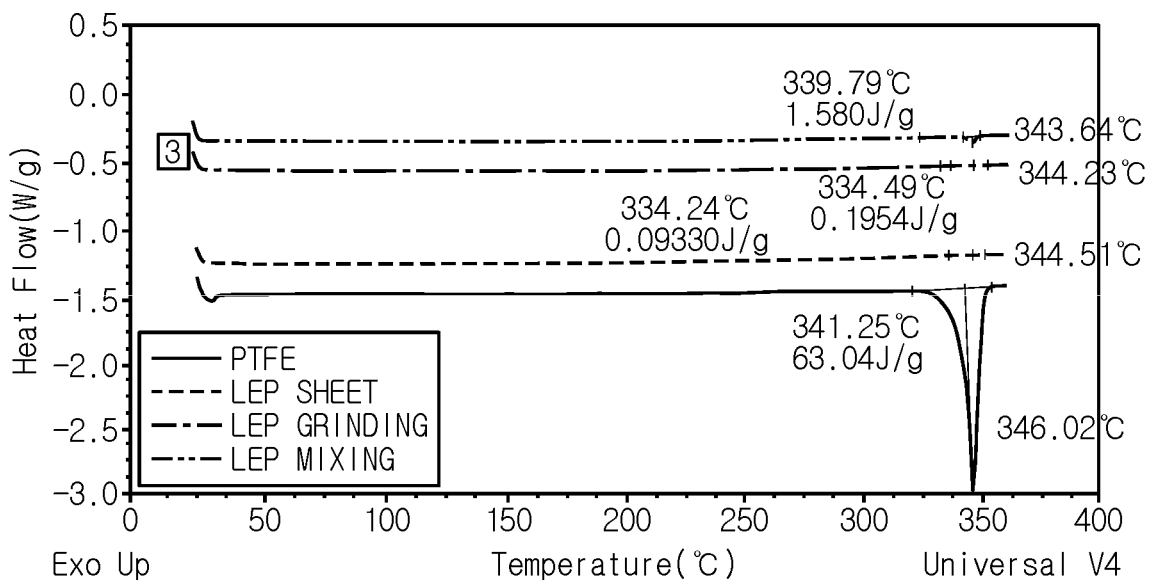
FIG. 2 is a graph illustrating the thermogravimetric analysis result using differential scanning calorimetry (DSC) according to Example 2.

As can be seen from Table 1, the mixture according to each of Examples 1-3 shows a crystallinity of 50% or less, and then the mixed powder for electrode shows a crystallinity controlled to 20% or less, and the dry electrode film shows a crystallinity controlled to 10% or less. FIG. 1 is a graph illustrating the thermogravimetric analysis result using differential scanning calorimetry (DSC) according to Example 1. It can be seen from FIG. 1 that each of the subsequently processed mixed powder for electrode (Grinding) and dry electrode film (Sheet) shows a lower crystallinity as compared to the powdery blend (Mixing). In addition, FIG. 2 is a graph illustrating the thermogravimetric analysis result using differential scanning calorimetry (DSC) according to Example 2. It can be also seen from Example 2 that each of the subsequently processed mixed powder for electrode (Grinding) and dry electrode film (Sheet) shows a lower crystallinity as compared to the powdery blend (Mixing). In addition, each of the dry electrode films according to Examples shows a tensile strength of 0.5 MPa or higher and a tensile elongation of 2% or more. Meanwhile, PTFE in FIG. 2 represents the specific crystallinity of 100% PTFE determined before processing PTFE, and is provided for the purpose of comparison with the crystallinity of PTFE after processing.

In Comparative Examples 1 and 2, the crystallinity of the binder resin of the obtained electrode mixture powder exceeded 20%. This means that fiberization was insufficient in the obtained mixed powder for electrodes, and it was difficult to manufacture a sheet-like dry electrode film through a subsequent calendering process. In particular, in Comparative Example 2, the degree of crystallinity of the binder resin in the powdery blend exceeded 60%, so that sufficient fiberization was not achieved even if the subsequent process was performed. In Comparative Example 3, the kneading process according to the present invention was not applied, so fine fiberization was not sufficiently achieved.

Determination of Crystallinity

For each Example and Comparative examples, a sample was taken from each of the powdery blend, mixed powder for electrode and the dry electrode film to measure each crystallinity. Next, about 5-12 mg of each sample was weighed and introduced to a differential scanning calorimeter (DSC, TA company), and then the melting point (Tm) and heat of melting (ΔHm) were measured in a temperature range of 25-360° C. at a heating rate of 10° C./min under nitrogen atmosphere.

The melting point (Tm) and the melting enthalpy (ΔHm) were analyzed based on the temperature (peak temperature) at the time point of showing the highest enthalpy during melting using the TROIS program of TA. The degree of crystallinity of each sample is expressed in % by dividing the measured enthalpy of melting (ΔHm) by DSC by the value of enthalpy of melting (ΔHm0) of a theoretically perfect crystal (100% crystallinity), which was calculated according to Mathematical Formula 1 as presented above. The heat of melting (ΔHf₀) of 100% binder crystals was taken as 85.4 J/g (Polymer, vol. 46, 2005, pp 8872-8882).

Determination of Tensile Strength and Tensile Elongation

The dry electrode film obtained from each Example and Comparative example was cut into a width of 10 mm. Then, the tensile strength and tensile elongation were measured at a tensile rate of 5 mm/min three times by using a tensile strength tester. The results are shown as the average value of the three measurements. Tensile strength is a applied stress until fracture occurs, and tensile elongation indicates the percentage (%, ratio of change in length to original length) of the elongated specimen until fracture occurs.

What is claimed is:

1. An electrode for an electrochemical device, comprising:
   a dry free-standing electrode film obtained by a dry manufacturing process using no solvent, wherein the dry electrode film comprises an electrode active material, a conductive material, and a binder resin,
   wherein the binder resin contained in the dry electrode film has a crystallinity of 10% or less,
   wherein the dry electrode film has a tensile strength of 0.5 MPa or more and 10 MPa or less in the machine direction (MD).

2. The electrode for an electrochemical device according to claim 1, wherein the dry electrode film has a tensile elongation of 2% or more and 30% or less.

3. The electrode for an electrochemical device according to claim 1, wherein the dry electrode film has a porosity of 20-50 vol %.

4. A method for manufacturing an electrode for an electrochemical device, the method comprising:
   (a) preparing a powdery blend comprising an electrode active material, a conductive material and a binder resin;
   (b) kneading the powdery mixture at 70-200° C. to prepare mixture lumps;
   (c) pulverizing the mixture lumps to obtain mixed powder for electrode; and
   (d) calendering the mixed powder for electrode to obtain a free-standing-type dry electrode film, wherein the binder resin contained in the dry electrode film obtained from the calendering (d) has a crystallinity (d) of 10% or less, wherein the method is a dry manufacturing process using no solvent.

5. The method for manufacturing the electrode for an electrochemical device according to claim 4, wherein the binder resin contained in the mixed powder for electrode obtained from the pulverizing (c) has a crystallinity (c) of 20% or less.

6. The method for manufacturing the electrode for an electrochemical device according to claim 4, wherein the binder resin contained in the mixture obtained from preparing the powdery blend (a) has a crystallinity (a) of 50% or less.

7. The method for manufacturing the electrode for an electrochemical device according to claim 4, wherein the preparing the powdery blend (a) is carried out at 500-30,000 rpm.

8. The method for manufacturing the electrode for an electrochemical device according to claim 4, wherein the kneading (b) is carried out under a rotation speed of 100 rpm or less.

9. The method for manufacturing the electrode for an electrochemical device according to claim 4, wherein the kneading (b) is carried out under a pressure of 0.5 kgf/cm$^2$ to 10 kgf/cm$^2$.

10. The method for manufacturing the electrode for an electrochemical device according to claim 4, wherein the kneading (b) is carried out under a pressure of an atmospheric pressure or more.

11. The electrode for an electrochemical device according to claim 1, wherein the binder resin comprises polytetrafluoroethylene (PTFE), polyvinylidene fluoride (PVDF), polyolefin, or a mixture of two or more of them.

12. The electrode for an electrochemical device according to claim 1, which further comprises a current collector, wherein the dry electrode film is disposed on at least one surface or both surfaces of the current collector.

13. The method for manufacturing the electrode for an electrochemical device according to claim 4, which further comprises preparing a current collector, disposing the dry electrode film on at least one surface of the current collector and carrying out lamination.

14. A secondary battery comprising the dry electrode as defined in claim 1, wherein the dry electrode is a positive electrode, and an electrode assembly comprising the positive electrode, a negative electrode and a separator is received in a battery casing together with a lithium-containing non-aqueous electrolyte.

* * * * *